INVENTOR
PAUL GORDON

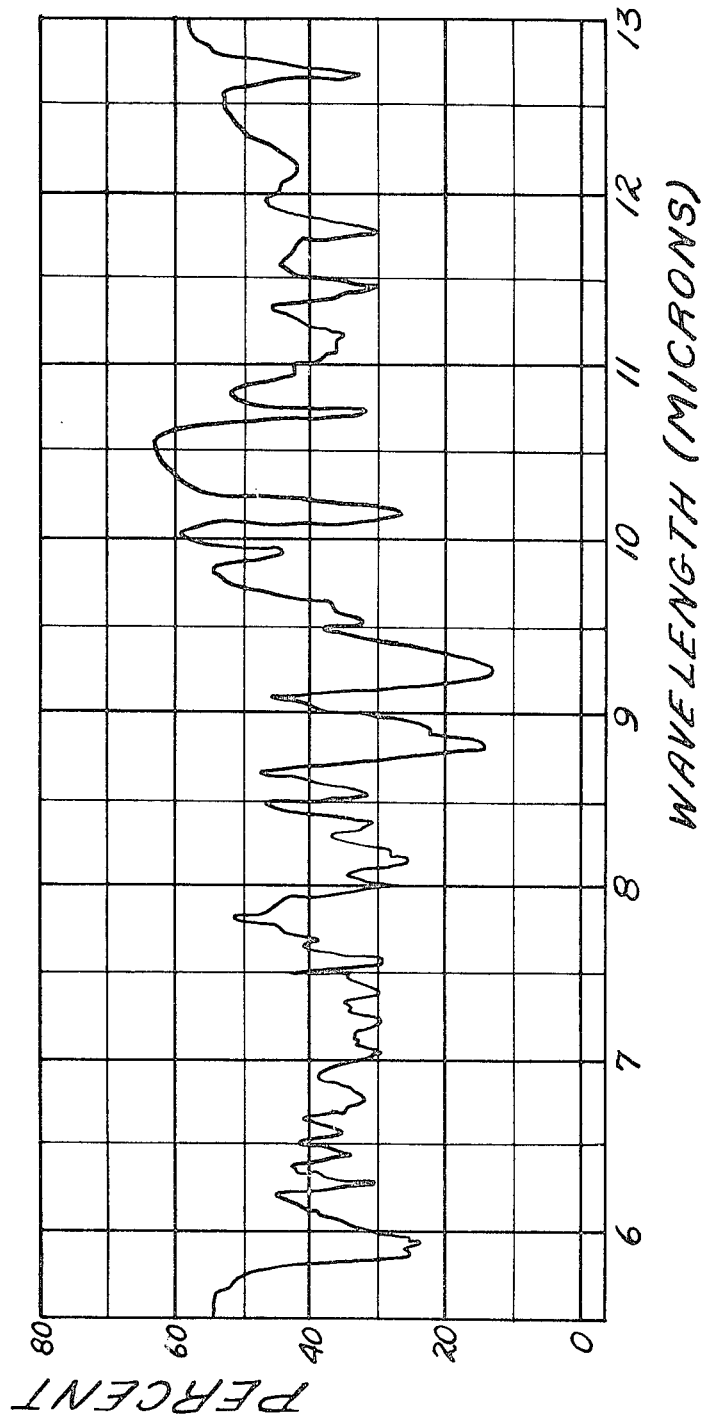

United States Patent Office 3,646,007
Patented Feb. 29, 1972

3,646,007
COMPLEX OF INOSINE WITH DIALKYL-AMINOALKANOL
Paul Gordon, Chicago, Ill., assignor to
Newport Pharmaceuticals, Inc.
Filed Aug. 28, 1969, Ser. No. 853,864
Int. Cl. C07d 51/54
U.S. Cl. 260—211.5 R
16 Claims

ABSTRACT OF THE DISCLOSURE

Complexes are formed in inosine and aminoalcohols of the formula

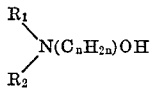

where $R_1$ and $R_2$ are lower alkyl and $n$ is an integer of 2 to 4. The complexes have pharmacological activity including the ability to restore deteriorated learning and memory behavior. The preferred aminoalcohol is dimethylamino isopropanol. The preferred ratio of inosine to aminoalcohol is 1:3.

---

The present invention relates to novel inosine derivatives.

Inosine is a riboside known to have physiological activity, e.g., see "Inosine" published by Morishita Pharmaceutical Co., Ltd. of Osaka, Japan and also "Metabolic Activator Inosine Preparations" published by Morishita Pharmaceutical Co., Ltd.

Inosine, however, has lesser learning enhancement properties in aged animals and in some situations where the complex of the present invention enhances learning, inosine actually retards learning.

It is an object of the present invention to develop novel inosine derivatives.

Another object is to restore deteriorated learning ability.

An additional object is to reduce senility and reduce aging characteristics.

A further object is to combat viral diseases.

Still further objects and the entire scope of applicability of the present invention will become apparent from the detailed description given hereinafter; it should be understood, however, that the detailed description and specific example, while indicating preferred embodiments of the invention, are given by way of illustration only, since various changes and modifications within the spirit and scope of the invention will become apparent to those skilled in the art from this detailed description.

It has now been found that these objects can be attained by making complexes of inosine with dialkyl-amino alkanols. The complexes can be used in the form of the free base or in the form of their salts with pharmacologically acceptable acids.

While the uses are primarily in the pharmacological area, the salts are useful as curing agents for melamine-formaldehyde or urea-formaldehyde resins.

The dialkylamino alkanols preferably have the formula

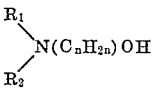

wherein $R_1$ and $R_2$ are lower alkyl, e.g. methyl to butyl, and $n$ and $n$ is an integer of 2 to 4. Typical inosine complexes include the complexes with dimethylamino ethanol, dimethylamino isopropanol, diethylamino ethanol, diethylamino isopropanol, methyl ethyl amino ethanol, di-methylamino propanol, dimethylaminobutanol, dibutyl-amino ethanol, dipropyl aminoethanol, diisopropylamino ethanol. The preferred aminoalcohol compound is dimethylamino, isopropanol since it exhibits the widest variety of properties.

As acids for forming the salts any pharmacologically acceptable acids can be used such as hydrochloric acid, sulfur acid, phosphoric acid, acetyl salicylic acid, d-tartaric acid, maleic acid, fumaric acid, succinic acid, citric acid, trans cinnamic acid, salcylic acid, adipic acid, methane sulfonic acid, acetic acid, p-aminobenzoic acid, propionic acid. Most of the salts with the amines are hygroscopic. However, the p-acetamidobenzoic acid salt of the inosine-dimethylamino isopropanol complex is a solid and is the presently preferred salt. It is prepared by mixing dimethylaminoisopropanol and p-acetamido benzoic acid mole for mole and then heating slightly. The salt thus formed is then dry mixed with inosine in a mole ratio of, for example, either 1:1 or 3:1 (salt to inosine). The complex is then formed, for example, by dissolving in water and can be recovered therefrom if desired by evaporation.

The mole ratio of aminoalcohol to inosine can vary from 1:1 up to 10:1. The preferred ratio is 3:1 (aminoalcohol to inosine).

According to the present invention unique pharmacological properties of N,N-dialkyl alkanolamine derivatives have been discovered which are pertinent to overcoming learning defects, reducing or eliminating senility, aid in the treatment of neuroatrophic disesases, e.g., amyotrophic lateral sclerosis (ALS) and other conditions in which the synthesis of large molecular weight ribonucleic acid (RNA) and proteins in the brain may be inadequate.

The compounds, and particularly the dimethylamino isopropanol complex of inosine, (mole ratio 1:1 to 10:1, preferably 3:1), have been found to (1) restore the deteriorated learning and memory behavior of aged rats to the young normal state for both difficult and easy tasks at all times of the day and night and (2) to enhance the capacity of young rats to learn very difficult tasks. The effect is unique as inosine or the aminoalcohols alone never produce the effects in question as intensely as the combination and, in fact, for young animals at certain times of the day, actually produce a learning impairment while in contrast the combination of the present invention produces an enhancement of learning.

The compounds of the present invention when the molar ratio of aminoalcohol to inosine is from 1:1 to 3:1 have an $LD_{50}$ in excess of 4,000 mg./kg. in rats or mice when fed either intraperitoneally or orally. Above a 10:1 aminoalcohol to inosine ratio there is a significant increase in toxicity.

It appears that the use of the aminoalcohols with inosine to form the complexes of the present invention modifies the metabolism of inosine in the brain. Thus, when one of the complexes (from dimethylamino isopropanol and radioactive inosine) was injected into the brain of a rat the metabolism of the radioactive inosine was altered radically (radioactive inosine was used as a tracer).

While inosine has some enhancing effect on the memory and learning of aged animals, e.g., rats and mice, the inosine-aminoalcohol complexes of the present invention (particularly the dimethylamino isopropanol complex, e.g., 1:1 molar ratio) have a greater effect.

In middle aged or young animals (rats) where inosine inhibited learning the complex of the present invention, on the contrary, enhanced learning. The difference in effect was dependent on the time of day. In the evening both the inosine and the complex [dimethylamino isopropanol complex (1:1 molar)] enhanced the learning.

At earlier times of the day, e.g. morning or early afternoon, only the complex enhanced learning.

The learning enhancement effects are best seen when the task used will bring out the deteriorated characteristics present in aged animals. In easy tasks which the aged animals can accomplish as well as the young, the inosine or the inosine aminoalcohol complex enhance learning only in the evening. With more difficult tasks, the complex (1:1 molar) enhances learning in the daytime while inosine itself inhibits learning.

At night when the animals (rats) are active, the complex (1:1 molar) is significantly better than inosine imparting learning enhancement on both very difficult and middlingly difficult tasks. In the morning with difficult tasks, the complex enhances learning while inosine inhibits learning.

With other drugs, it has been established by those skilled in the art that there is a correlation between learning enhancement in other mammals, e.g., rats.

The inosine dimethylamino isopropanol complex (1:1 molar) makes indistinguishable the learning and memory of young rats and old rats in whom learning and memory was defective in the absence of treatment. The results are much more dramatic than has been found with diphenyl hydantoin.

It has also been observed that the inosine complex of the invention [e.g., 1:1 molar or 1:3 molar (inosine to aminoalcohol)] modify the polyribosomes, making them more internally hydrogen bonded. The complex does this to a greater extent than inosine and inosine does this to a greater extent than does blank controls. Furthermore, in tests on rats, it has been found that the spectrum of the ribosome type in the brain changes uniquely in the presence of the complex (e.g., the dimethylamino isopropanol complex 1:1 molar) but not in the presence of inosine alone. A new light weight band appears which as the characteristics of the informosome.

The complexes of the present invention and particularly the inosine dimethylamino isopropanol amine complex have also exhibited potent antiviral characteristics. Thus, in animal influenza and herpes virus systems where inosine is almost completely ineffective, the complex has protected 60–80% of the animals (rats) when all of the controls died. It has further been found that the complex (1:1 or 3:1 molar aminoalcohol to inosine) can be administered up to 12 hours after inoculation with the virus whereas in 15 minutes infection will set it.

When inosine and dimethylamino isopropanol were placed in aqueous solution and evaporated to dryness, there was obtained first a precipitate of pure inosine and then the complex as a residue having a different IR spectrum. The molar ratio of aminoalcohol to inosine was 3:1.

Inosine and excess dimethylamino isopropanol hydrochloride were mixed and fused. An attempt was made to sublime off the excess amine. Not all of the amine could be recovered by sublimation. The residue had 3 amino groups per inosine group.

When inosine and dimethylamino isopropanol were dissolved in water in the molar ratio of 1:10 (inosine to aminoalcohol) the ultraviolet spectroscopy showed a unique spectrum, not merely an additive effect. Thus at 285 millimicrons, there was a unique UV peak and a negative peak at 200 millimicrons.

Evidence of the novelty of the complex is shown in the drawings which are the IR (infrared) curves for three compounds in the range of 6 to 13 microns.

FIG. 3 is the IR curve for a dry physical mixture of inosine and dimethylaminoisopropanol hydrochloride (1:1 molar).

Figure 1:
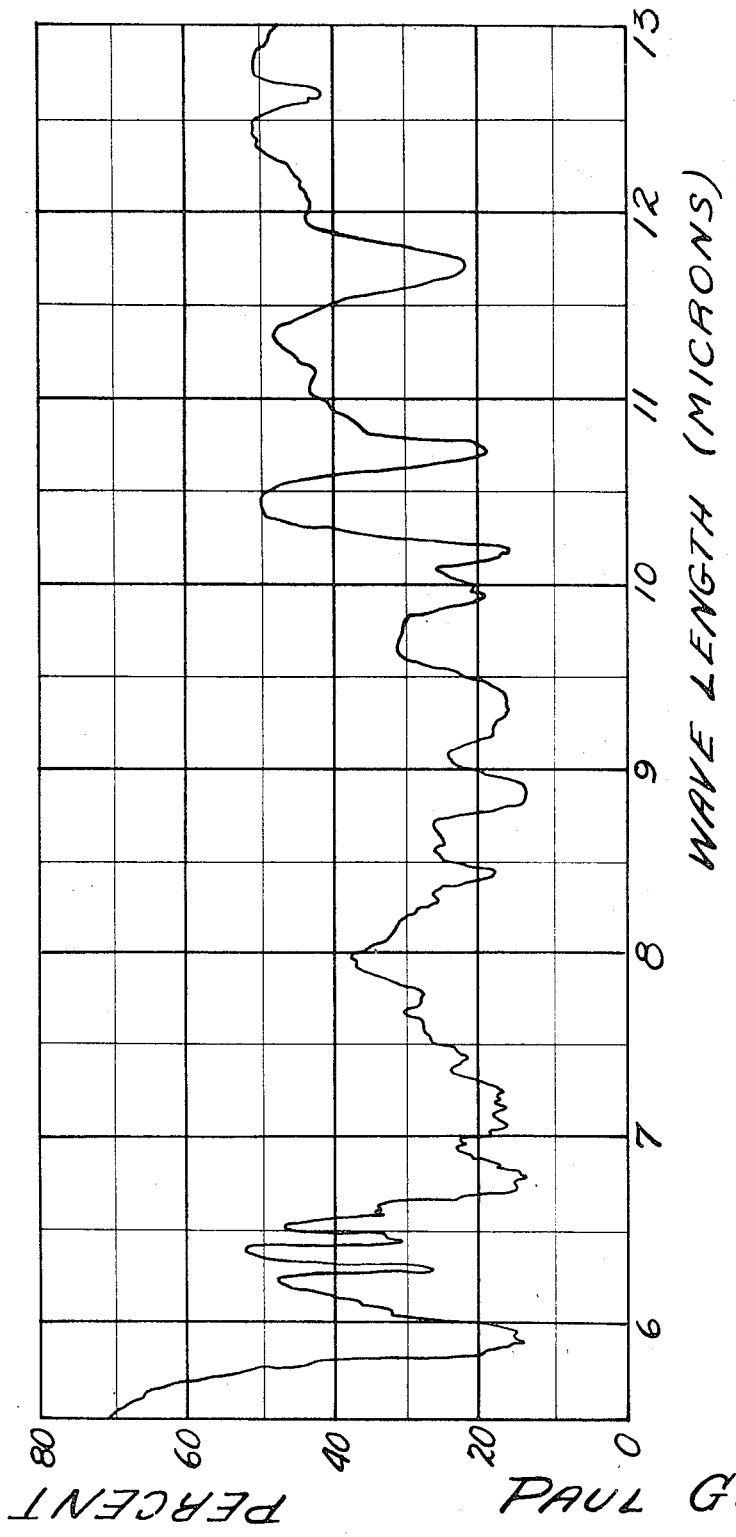
FIG. 1 is the IR spectrum for the complex of 1 mole of inosine with 4 moles of dimethylaminoisopropanol hydrochloride dissolved in water followed by drying.
Figure 2:
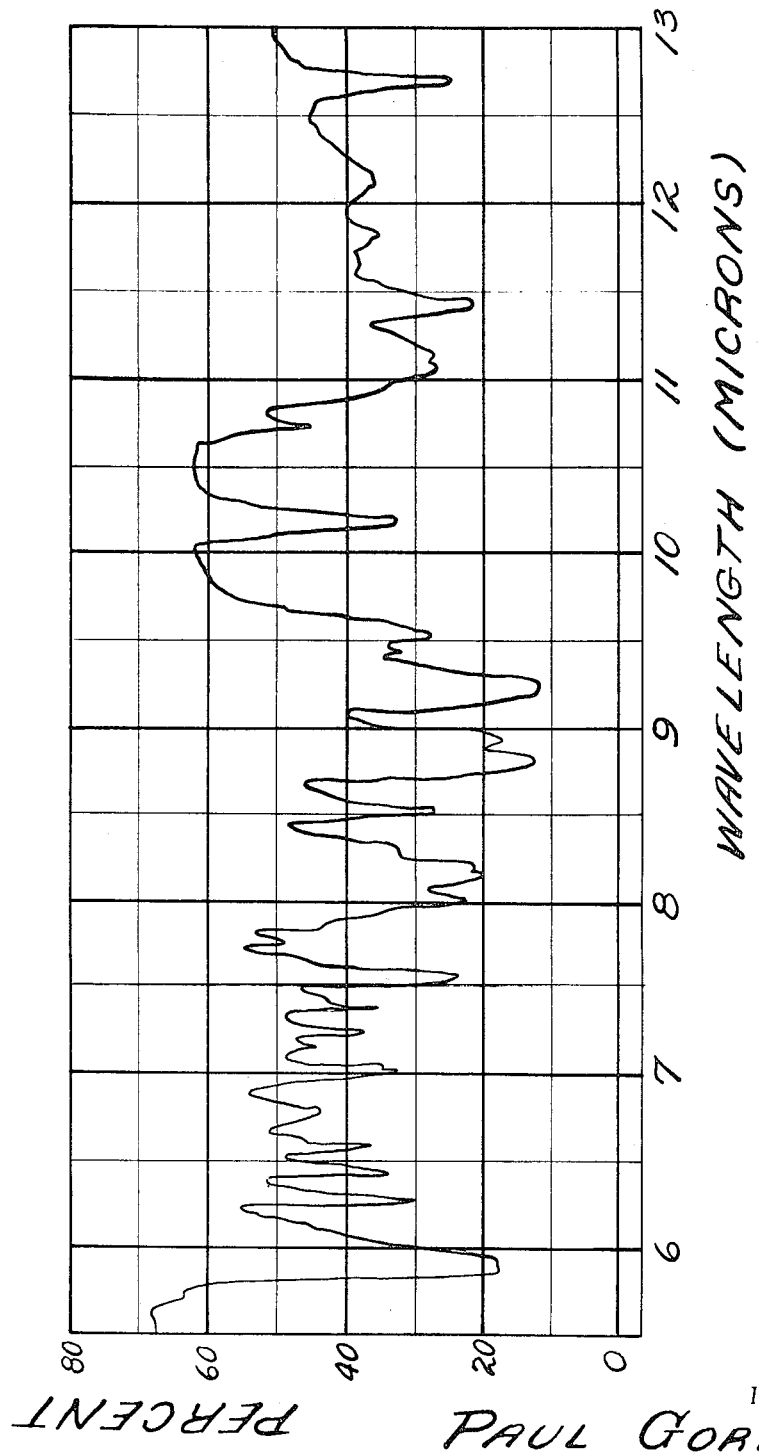
FIG. 2 is the IR spectrum for inosine.

A comparison of the curves makes it evident that the complex (FIG. 1) has a different IR spectrum or curve then would be expected from its components. Thus the expected peaks at above 11.45 microns, at 8 microns, at 8.1 microns and at 8.55 microns are missing in FIG. 1 but are present in FIGS. 2 and 3.

With mole ratios of inosine to aminoalcohol, e.g. dimethylamino isopropanol, of as little as 1:10 a difference in ultraviolet (UV) spectroscopy was noted over that to be expected from the constituents.

When inosine and dimethylamino isopropanol were mixed in distilled water UV spectra were observed which reveal the existence of unique electron states giving evidence of complex formation. Thus, there was studied the spectrum of aqueous solution 0.5 molar in dimethylamino isopropanol and 0.022 molar in inosine at a pH of 10.0 (using a 0.5 molar $Na_2HPO_4$—KOH buffer) and it was compared with the spectrum in the absence of inosine. Short wavelength energy was found to disappear and longer wavelength energy to appear in the presence of the inosine. This shift towards longer wavelength observance was associated with the appearance of a new peak at about 270 millimicrons.

At a pH of 7.2 an aqueous solution 0.5 molar in dimethylamino isopropanol and 0.037 molar in inosine showed a similar but weaker reaction. Minor pH adjustments were made to the inosine solution employing minute quantities of NaOH; the dimethylamino isopropanol was titrated with HCl to the pH value of 7.2 and was thus in the form of the hydrochloride salt. The new peak occurred at about 285 millimicrons (rather than at 270 millimicrons).

A variety of ratios of inosine to dimethylamino isopropanol were studied at both a pH of 10.0 and 7.2 with qualitatively similar results. The system was also studied in the presence and absence of 0.5 molar HCl, added to the inosine solution without dimethylimino isopropanol without significant change in results, indicating that the spectral differences observed were not a function of the presence of chloride or non-specific cations. It has been observed that dimethylamino isopropanol and inosine together in an aqueous medium generate UV absorption spectra in alkaline, neutral and acid pH ranges which depart from the sum of the spectra of the solutes taken separately in such a way as to reveal complex formation.

On the other hand, it has also been noted that there is a disappearance of a peak at about 200 millimicrons at a pH of 7 when using an aqueous solution of inosine and dimethylamino isopropanol in the mole ratio of 1:10.

The diffusion coefficient of inosine in water was also observed. At a pH of 10.4, the diffusion of inosine into water is about 80% greater than that of an inosine-dimethylamino isopropanol mixture. Furthermore, inosine diffuses more rapidly into an aqueous solution of dimethylamino isopropanol than into water alone. All of the diffusion and spectroscopic properties set forth above indicate that there is a union of the two components, i.e., inosine and the aminoalcohols.

The combination of inosine and aminoalcohol, e.g., dimethylamino isopropanol or dimethylamino ethanol inhibits ribonuclease which neither component can do alone.

It has also been observed that the administration of a solid powder mixture of inosine and the aminoalcohol hydrochloride, e.g., dimethylamino isopropanol hydrochloride, when put into solution at the time of administration, had the same effect as the preformed water solution. The two components of the complex can be administered as the preformed complex, together or even separately, providing there is an opportunity for the two components to get together in the body of the animal.

Dimethylaminopropanol does not have the desired chemicophysical properties to nearly the same extent as dimethylamino isopropanol.

The compounds or complexes of the present invention can reduce aging characteristics in mammals such as rats, mice, guinea pigs, dogs, cats, horses, cattle, sheep, and pigs. The complexes, e.g., the inosine dimethylamino isopropanol complex, can be used in breeding animals since they reverse deterioration in the liver and the brain and furthermore enhance the brain function.

A definite antiviral action has been observed against RNA (ribonucleic acid) and DNA (desoxyribonucleic acid) viruses including influenza type A (both the PR strain and the Bethesda strain) in mice as well as herpes virus (Lu) in mice. In these tests, the inosine and dimethylamino isopropanol were mixed in aqueous solution in molar ratios varying from 1:1 to 1:10 and adjusted to pH 7.0 with HCl. This solution was either injected intraperitoneally into mice twice daily at a dose level of 138 mg./kg. or placed in the water supply such that each animal consumed approximately 275 mg./kg. per day via natural water intake. The inosine DMAIP (dimethylamino isopropanol) combination suppressed morbidity and death due to inoculation of influenza or herpes virus. Inosine alone was ineffective against herpes virus and had a minor insignificant effect against influenza virus.

Typical results were as follows:

Influenza virus

In mice given influenza virus (A-2 Bethesda strain) by intranasal inoculation with treatment begun at 3 hours after inoculation, 0 of 59 animals given placebo intraperitoneal injections (saline) survived permanently.

Herpes virus

Herpes virus was given intravenously to mice and treatment begun after 3 hours. 1 of 59 control animals survived, while 17 of 30 animals survived who were treated intraperitoneally with the inosine—DMAIP (1:3 molar).

As previously indicated, the ratio of inosine to aminoalcohol is preferably 1:1 or greater, most preferably between 1:3 and 1:4 in making the complexes of the invention. If the ratio is reduced to below 1:1, e.g., 1:0.5, then the solubility of the complex in water is reduced.

It is believed that the complexes of the present invention act by changing the internal structure of biological polymers and polymer-rich organeles in such a way as to render these less inclined to generate positive entropy or randomness.

This change is important in aging because it has been found that polymer-rich organeles in aging tissue tend to generate an abnormal amount of positive entropy, i.e., randomness. The changes produced by the complexes of the invention renders the polymer-rich organeles more resistant to influences inducing loss in internal hydrogen bonding and hence renders them more resistant to attack by destructive enzymes.

The p-acetamidobenzoate salt of the complex is prepared in a simple manner by mixing the aminoalcohol, e.g., dimethylamino isopropanol, and p-acetamidobenzoic acid in equimolar amounts and heating slightly. The salt thus produced can be simply mixed with inosine in a mole ratio of salt to inosine of 1:1, 3:1, 4:1, etc. and the product is ready to put into aqueous solution. The aqueous solution can then be evaporated to dryness to obtain the complex in solid form. It has been observed with inosine—DMAIP p-acetamidobenzoate that the solubility increases as the mole ratio goes from 1:1 to 1:2 to 1:3 to 1:4, but that at 1:5 there is no increase in solubility. The inosine—DMAIP p-acetamidobenzoate salt is neutral.

Dimethylamino-2-propanol-p-acetamidobenzoate 44.75 grams (0.25 mole) of p-acetamidobenzoic acid was suspended in 125 ml. of anhydrous methanol at room temperature and 36 ml. (0.29 mole) of dimethylamino isopropanol were added with mechanical stirring. The reaction was exothermic. After dissolution of the acid and cooling, the solution was suction-filtered through paper and poured into 400 ml. of anhydrous ethyl ether. Crystallization was immediate. The white crystalline material was suction-filtered, washed 3 times with additional anhydrous ethyl ether, dried at room temperature and recrystallized from 100 ml. absolute methanolethyl acetate 25:75 (by volume). This product was dried at 50° C. under vacuum. Yield 56.5 grams (80%), M.P. 147–148° C., Empirical formula $C_{14}H_{22}O_4N_2$, C 59.54% (Theory 59.50%), H 7.83% (Theory 7.80%), N 10.04% (Theory 9.92%).

The salt was readily soluble in water and very stable over a wide range of atmospheric conditions. It decomposed around 25–30° C. above its melting point yielding the free acid quantitatively. By heating at 50° C. at normal pressure the change in weight was

| Hours: | Percent |
|---|---|
| 66 | −0.22 |
| 90 | −0.28 |
| 172 | −0.44 |

The effect of dimethylamino-2-propanol (DMAIP) and dimethylamino - 2 - propanol - p-acetamido benzoate (DMAIPA) on the water solubility of inosine is set forth below.

It should be noted that 268 mg. of inosine will dissolve in 159 grams of DMAIP.

TABLE A

| Inosine | | DMAIP | | Volume H₂O for dissolution, ml. |
|---|---|---|---|---|
| Moles | Mg. | Moles | Mg. | |
| 1 | 268 | 0 | 0 | 16.75 |
| 1 | 268 | 1 | 103 | 1.12 |
| 1 | 268 | 2 | 206 | 0.44 |
| 1 | 268 | 3 | 309 | 0.40 |
| 1 | 268 | 4 | 412 | 0.35 |
| 1 | 268 | 5 | 515 | 0.40 |
| 1 | 268 | 6 | 615 | 0.47 |

TABLE B

| Inosine | | DMAIP | | Volume H₂O for dissolution, ml. |
|---|---|---|---|---|
| Moles | Mg. | Moles | Mg. | |
| 0 | 0 | 1 | 282 | 0.14 |
| 1 | 268 | 1 | 282 | 6.8 |
| 1 | 268 | 2 | 564 | 3.5 |
| 1 | 268 | 3 | 846 | 2.8 |
| 1 | 268 | 4 | 1128 | 2.2 |
| 1 | 268 | 5 | 1410 | 2.2 |
| 1 | 268 | 6 | 1692 | 2.2 |

All solutions set forth in Tables A and B were made at 23° C. In regard to Table B, it should be noted that a small amount of p-acetamidobenzoic acid precipitated when the water was added.

There have been identified unique pharmacological properties in N,N-dialkyl alkanolamine derivatives of inosine use in correcting learning defects, suppressing viral infections, overcoming senility, neuroatrophic diseases and other conditions in which the synthesis of large molecular weight RNA and proteins in the brain may be inadequate or altered.

Principally, it has been found that the inosine-aminoalcohol complex restores the deteriorated learning and memory behavior of aged rats to the young normal state for both difficult and easy tasks at all times of the day and night and that the complex enhances the capacity of young rats to learn very difficult tasks. The effect is unique, as inosine or the amine alcohols alone never produce the effects in question as intensely as the combination and, in fact, for young animals at certain times of the day, inosine or the amino alcohols actually produce a learning impairment, while the combination produced an enhancement. Dramatic changes in the learning behavior of young and old rats were examined by application of avoidance learning tasks of graded difficulty, as described by Doty [Journal of Gerontology, vol. 21, pp. 287–290 (1966)].

The data below in Table 1 exemplify effects of the N,N-dimethylaminoethanol complex of inosine. These data were gathered between 7 and 9 p.m., which is the beginning of the rat "day" as they are nocturnal animals, and represent the number of successful avoidance (or task solutions) in 90 trials made by rats of different ages when exposed to a regimen of learning at one of two different levels of task difficulty. Thirty trials were given per day, 2 hours following either placebo injection or 100 mg./kg. dimethylaminoethanol inosinate complex. This dosage was used in all behavioral studies. These data show that the complex enhances the capacity to learn of both young and old animals; and that it brings the deteriorated learning performance of aged animals, especially evident for the difficult tasks, to young normal control levels. Subjecting these data to a computer analysis of variance, the ranking of treatment with regard to their capacity to produce learning-enhancing effects was inosine-aminoalcohol complex>inosine>placebo (p<0.001).

Table 2 explores the effects of inosine and inosine–N,N-dimethylaminoisopropanol complex on the learning capacity of middle-aged rats (13 months) for difficult tasks examined at 9 a.m. according to the protocol described above. The complex produced a significantly greater degree of task learning than inosine, and inosine actually impaired learning relative to placebo-treated controls, at this time of day. It is pertinent to this difference in actual sign of effect between inosine and the complex in the above animals, examined at 9 a.m., that brains from animals treated with these drugs also manifest probably significant biochemical effects that are opposite in sign; that is, in the presence of polyribosomes plus cell sap fractions from inosine-treated brains, RNA was destroyed more rapidly than in the control system, while in the presence of such fractions from the complex-treated brains, RNA was destroyed more slowly than in the control system.

In another experiment, there was explored effects of inosine and the dimethylaminoisopropanol inosinate complex, on the acquisition and recall of a very easy task examined at either 9 a.m. or 9 p.m. In this case, the recall was carried out 10 days after acquisition without additional drug treatment. Criterion here represents achievement of 7 successful avoidances out of 10 trials; thus the fewer the number of trials required to achieve this level of performance, the greater the intelligence of the animal. In addition to learning effect, a study of spontaneous motor activity was carried out in similar animals given the treatments studied. The results are set forth in Table 3. It is seen that in the morning, when given at a time of high spontaneous sleep activity for rats, the complex actually impairs learning and recall in the young animals while at the same time significantly reducing the spontaneous motor activity. Such an impairment, in this case, can be related to a tendency of the drug to reduce spontaneous activity or to increase the tendency to sleep as the acquisition of simple tasks in rodents is easily interfered with by effects that decrease vigilance. In the very aged animals, the spontaneous activity during both the 9 a.m. and the 9 p.m. periods are reduced in both control and treatment groups and are not further reduced by drug. In this animal age group (the target population), the inosine-dimethylamino isopropanol complex produces a significant enhancement of both acquisition and recall.

The optimum functioning of the brain or other areas of nervous tissue, especially in situations of learning, adapting or other types of high activity, is generally considered to require the synthesis of new RNA and protein. The aged brain synthesizes less RNA and protein of the heaviest molecular weight, therefore, deficit states of behavior and nervous system function may exist in which a drug capable of enhancing the synthesis of large molecular weight RNA and protein would be specifically beneficial. In sucrose density gradient polyribosome studies, the inosine-aminoalcohol complex of the invention increases the rate of synthesis of RNA to a greater degree than inosine. The inosine-aminoalcohol complex was an inhibitor of the enzyme, RNase, which destroys RNA. While inosine stimulated this enzyme, inosine increases the rate of synthesis of RNA over controls to a significantly smaller degree than the complex of the invention. Furthermore, the complex, but not inosine causes the increased appearance of an important particulate body recently discovered in brain, called the informosome. This is a body identified in its centrifugation characteristics as falling between 20 and 60 S. Svedberg units, significantly lighter than ribosome monomers. This body has been held to participate in transport of information-carrying RNA from the nucleus to the cytoplasm, where messenger RNA union with ribosomes occurs. The action has been proposed as a means of protecting messenger RNA from premature destruction by RNase. It has been found that the complex of the invention identified increases the informosome content specifically in aged brain.

TABLE 1.—EFFECT OF INOSINE AND INOSINE-DIMETHYLAMINOETHANOL ON TASK ACQUISITION

[Mean successes in 90 trials by all subjects testing between 7:00–9:00 p.m.]

| | | Task | |
|---|---|---|---|
| Age | Treatment | Discriminated aviodance (intermediate difficulty) | Delayed avoidance (very difficult) |
| 90 days | Inosine | 72.8 | 34.2 |
| | Inosine-DMAE | 72.8 | 40.6 |
| | Saline | 68.2 | 31.6 |
| 700 days | Inosine | *72.1 | *32.9 |
| | Inosine-DMAE | *74.3 | *34.6 |
| | Saline | 61.6 | 18.9 |

*Significantly larger than mean for same age control rats (P<0.01). N=8 for all groups. (N is the number of animals.)
Analysis of variance establishes that the ranking of inosine-DMAE> inosine>saline for avoidances made in 90 trials is significant at P<0.01. P is the probability value depending on chance alone.

TABLE 2.—EFFECT OF INOSINE AND INOSINE-DIMETHYL AMINOISOPROPANOL ON TASK ACQUISITION

[Mean successes in 90 trials by all subjects testing at 9:00 a.m.]

| Age | Treatment | Delayed avoidance task (very difficult) |
|---|---|---|
| 380 days | Saline | 22 |
| | Inosine | 6 |
| | Inosine-DIP | *28 |

*Significantly larger than mean for inosine-treated rats (P<0.01). N=6 for all groups.

TABLE 3.—EFFECT OF INOSINE-DIMETHYLAMINOISOPROPANOL ON TASK ACQUISITION

[Trails run to achievement of criterion and open-field activity]

| | | | Task | | |
|---|---|---|---|---|---|
| | | | Simple avoidance (easy) | | Open-field squares entered |
| Age | Treatment | Time | Acquisition | Recall | |
| 60 days | Saline | 9 a.m. | 14 | 9 | 73.4 |
| | | 9 p.m. | 13 | 6 | 75.6 |
| | Inosine-DIP | 9 a.m. | ª21 | 14 | ᶜ63.4 |
| | | 9 p.m. | 13 | 8 | 70.5 |
| 180 days | Saline | 9 a.m. | 16 | 11 | 114.5 |
| | | 9 p.m. | 15 | 8 | 122.8 |
| | Inosine-DIP | 9 a.m. | ª22 | 11 | ᶜ101.7 |
| | | 9 p.m. | 15 | 15 | 119.6 |
| 730 days | Saline | 9 a.m. | ᵇ22 | 17 | 41.2 |
| | | 9 p.m. | 20 | 13 | 39.6 |
| | Inosine-DIP | 9 a.m. | ª15 | 10 | ᶜ35.4 |
| | | 9 p.m. | ª14 | ª7 | 37.2 |

ª Significantly different from mean obtained by saline groups of same age and test time (P<0.01).
ᵇ Significantly larger than means of saline controls in other age groups (P<0.05).
ᶜ Significantly different from mean obtained by saline groups of same age and test time (P<0.05).
N=8 for all groups.

In Table 1, the dimethylaminoethanol inosine complex had a mole ratio of 1 to 1. The aqueous solution injected contained 30 mg. of complex per 1.0 ml. of water.

In Table 2, the inosine was injected in an amount of 70 mg./kg. body weight. The aqueous solution injected containing 20 mg. of inosine per 1.0 ml. of water. The inosine-dimethylamino isopropanol complex had a mole ratio of 1 to 1 and was injected in an amount of 100 mg./kg. body weight. The aqueous solution injected contained 30 mg. of inosine-dimethylamino isopropanol complex per 1.0 ml. of water.

In Table 3, the saline was injected in an amount of 8.7 mg. of salt/kg. body weight, the aqueous solution injected containing 8.7 mg. of salt per 1.0 ml. of water. The inosine-dimethylamino isopropanol complex had a mole ratio of 1 to 1 and was injected in an amount of 100 mg./kg. body weight. The aqueous solution injected contained 30 mg. of inosine-dimethylamino isopropanol complex per 1.0 ml. of water.

The complexes of the present invention can be fed to a mammal in a dosage of 1 to 1000 mg./kg. of body weight.

What is claimed is:

1. A complex which is the reaction product of inosine with a diloweralkylamino-lower-alkanol.
2. A complex according to claim 1 wherein the dialkylaminoalkanol has the formula

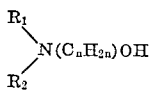

where $R_1$ and $R_2$ are lower alkyl and $n$ is an integer of 2 to 4.

3. A complex according to claim 2 having a mole ratio of inosine to aminoalkanol of from 1:1 to 1:10.
4. A complex according to claim 3 wherein $n$ is 2.
5. A complex according to claim 4 wherein $R_1$ and $R_2$ are methyl.
6. A complex according to claim 5 which is an inosine-dimethylamino ethanol complex.
7. A complex according to claim 6 wherein the ratio of inosine to dimethylaminoethanol is from 1:1 to 1:4.
8. A complex according to claim 3 which is an inosine-dimethylaminoisopropanol complex.
9. A complex according to claim 8 wherein the ratio of inosine to dimethylamino isopropanol is from 1:1 to 1:4.
10. A complex according to claim 8 wherein the hydrochloride salt of which has the infrared spectrum of FIG. 1 of the drawings.
11. A complex according to claim 1 wherein the complex is present as a pharmacologically active salt.
12. A complex according to claim 11 wherein the salt is the p-acetamidobenzoate.
13. A complex according to claim 12 wherein the dialkylamino alkanol is either dimethylamino ethanol or dimethylamino isopropanol.
14. A mixture of inosine and a diloweralkylamino-lower-alkanol.
15. A mixture according to claim 14 wherein the dialkylamino alkanol has the formula

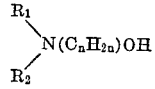

where $R_1$ and $R_2$ are lower alkyl and $n$ is an integer of 2 to 4.

16. A mixture according to claim 15 having a mole ratio of inosine to aminoalkanol of from 1:1 to 1:10.

References Cited

UNITED STATES PATENTS 3,337,528    8/1967    Saito et al. _____ 260—211.5

OTHER REFERENCES

"The Merck Index" 8th ed. 1968, Merck and Co., Inc., Rahway, N.J., p. 357.

LEWIS GOTTS, Primary Examiner

J. R. BROWN, Assistant Examiner

U.S. Cl. X.R.

424—180; 260—69 R

UNITED STATES PATENT OFFICE
CERTIFICATE OF CORRECTION

Patent No. 3,646,007            Dated    February 29, 1972

Inventor(s)     Paul Gordon

It is certified that error appears in the above-identified patent and that said Letters Patent are hereby corrected as shown below:

Col. 2, line 4, remove the comma (,).

Col. 2, line 8, change "sulfur" to --sulfuric--.

Col. 6, in Table B, line 36, "DMAIP" should
       be --DMAIPA--.

Col. 6, line 50, before "use" insert --of--.

Signed and sealed this 19th day of March 1974.

(SEAL)
Attest:

EDWARD M. FLETCHER, JR.        C. MARSHALL DANN
Attesting Officer                Commissioner of Patents